(12) United States Patent
Shin et al.

(10) Patent No.: US 7,450,317 B2
(45) Date of Patent: Nov. 11, 2008

(54) ZOOM LENS

(75) Inventors: Jeong-Kil Shin, Suwon-si (KR);
Byung-Kwon Kang, Suwon-si (KR);
Dong-Hoon Jang, Swon-si (KR)

(73) Assignee: Samsung Electronics Co., Ltd.,
Maetan-Dong, Yeongtong-Gu, Suwon-Si,
Gyeonggi-Do (KR)

( * ) Notice: Subject to any disclaimer, the term of this patent is extended or adjusted under 35 U.S.C. 154(b) by 251 days.

(21) Appl. No.: 11/388,625

(22) Filed: Mar. 24, 2006

(65) Prior Publication Data

US 2006/0215276 A1    Sep. 28, 2006

(30) Foreign Application Priority Data

Mar. 25, 2005    (KR) .................... 10-2005-0024967

(51) Int. Cl.
*G02B 15/14* (2006.01)
(52) U.S. Cl. ...................................... 359/689; 359/682
(58) Field of Classification Search ......... 359/680–682, 359/689
See application file for complete search history.

(56) References Cited

U.S. PATENT DOCUMENTS 6,124,984 A * 9/2000 Shibayama et al. ......... 359/689
6,614,599 B1 * 9/2003 Watanabe ................... 359/689

FOREIGN PATENT DOCUMENTS

| CN | 1282881 | 2/2001 |
|---|---|---|
| KR | 2004295075 | 10/2004 |

* cited by examiner

*Primary Examiner*—Scott J Sugarman
(74) *Attorney, Agent, or Firm*—Cha & Reiter, LLC (57) ABSTRACT

A zoom lens includes a first lens group having a negative refracting power, a second lens group having a positive refracting power and being aligned closer to an image surface than the first lens group, and a third lens group aligned closer to the image surface than the second lens group. The distance between first and second lens groups is shortened and the distance between second and third lens groups is lengthened as the zoom lens performs zooming action from a wide angle position to a telephoto position.

20 Claims, 10 Drawing Sheets

ZOOM LENS

CLAIM OF PRIORITY

This application claims the benefit under 35 U.S.C. 119(a) of an application entitled "Zoom Lens," filed with the Korean Intellectual Property Office on Mar. 25, 2005 and assigned Ser. No. 2005-24967, the contents of which are incorporated herein by reference.

BACKGROUND

The present invention relates to a zoom lens. More particularly, the present invention relates to a compact zoom lens adaptable for a small-sized video camera or digital camera.

A conventional zoom lens for a camera having a high zoom ratio is generally known in the art. The lens includes a first lens group that is fixed and has a positive refracting power, a second lens group that has a negative refracting power and which is movable along an optical axis for zooming, a third lens group that is fixed and has a positive refracting power, and a fourth lens group that has a positive refracting power and which is movable along an optical axis to achieve focus correction. The first to fourth lens groups are sequentially aligned from a subject side to an image surface of the zoom lens. The zoom ratio refers to the ratio between focal length (fw) in the wide angle position and focal length (ft) in the telephoto position, that is, ft/fw. The zoom lens has a minimum focal length in the wide angle position and a maximum focal length in the telephoto position.

A small-sized camera of recent design features a compact zoom lens and a camera body of compact size. The refracting force (also known as refracting power) of each lens group of the zoom lens is raised so as to minimize the full length of the zoom lens. If, however, the refracting power of each lens group increases, the Petzval sum may increase. As a consequence, not only is optical performance of the zoom lens degraded, but eccentricity may seriously increase when assembling the zoom lens into the camera. Such a zoom lens is therefore unsuitable for a high-pixel camera.

As generally known in the art, a mirror or a prism can be aligned in the zoom lens in order to reduce the full length of the zoom lens. The mirror or prism achieves this, by bending the optical axis of the zoom lens at a right angle. For instance, Japanese Patent Unexamined Application No. 8-248318 discloses a zoom lens in which a rectangular prism is installed in a first lens group of the zoom lens so as to bend an optical axis of the zoom lens. However, the zoom lens disclosed in Japanese Patent Unexamined Application No. 8-248318 falls short in realizing compactness of the zoom lens, because the diameter and size of a first lens aligned at the front portion of the first lens group relative to the subject must be enlarged and the number of lenses forming the zoom lens must be increased.

Although demands for a compact zoom lens suitable for a small-sized video camera or digital camera gradually increase, the conventional zoom lens may not meet the demands.

There accordingly exists a need for a compact zoom lens having high performance suitable for a small-sized video camera or digital camera.

SUMMARY OF THE INVENTION

The present invention has been made to solve the above-mentioned shortcomings of the prior art, and the present invention provides, in one aspect, a compact zoom lens having high performance suitable for a small-sized video camera or digital camera.

According to one aspect of the present invention, there is provided a zoom lens comprising: a first lens group having a negative refracting power; a second lens group having a positive refracting power and being aligned closer to an image surface than the first lens group; and a third lens group aligned closer to the image surface than the second lens group, wherein a distance between first and second lens groups is shortened and a distance between second and third lens groups is lengthened as the zoom lens performs zooming action from a wide angle position to a telephoto position.

According to another aspect of the present invention, there is provided a zoom lens comprising: a first lens group having a negative refracting power; a second lens group having a positive refracting power and being aligned closer to an image surface than the first lens group; and a third lens group including a reflecting surface for bending an optical axis and being aligned closer to the image surface than the second lens group.

Preferably, the zoom lens satisfies the following equation:

$$0.6 \leq \frac{d1pw}{d1iw} \leq 0.8,$$

wherein d1pw refers to a distance along the optical axis from a front of a subject side of the first lens group to the reflecting surface, and d1iw refers to a distance along the optical axis from a front of a subject side of the first lens group to an image surface.

BRIEF DESCRIPTION OF THE DRAWINGS

The above features and advantages of the present invention will be more apparent from the following detailed description taken in conjunction with the accompanying drawings, in which.

DETAILED DESCRIPTION

In the following discussion, detailed description of known functions and configurations incorporated herein is omitted for clarity of presentation.

Prior to explaining embodiments of the present invention, the operation and effect of the present invention is described.

A zoom lens of the present invention includes a first lens group having a negative refracting power and being movably aligned closest to a subject side, a second lens group having a positive refracting power and being movably aligned closer to an image surface than the first lens group, and a third lens group having a negative refracting power and being fixedly aligned closest to the image surface. Each of the first and second lens groups is preferably an optical system designed to be moved as a unit.

When the zoom lens performs zooming action, the first and second lens groups move along the optical axis to achieve focus correction. In particular, the first and second lens groups move in such a manner that the zooming action and focus correction of the zoom lens can be simultaneously achieved. Preferably, since the magnifying power of the zoom lens gradually increases from the wide angle position to the telephoto position, the distance between the first and second lens groups is shortened and the distance between the second and third lens groups is correspondingly lengthened. Since die zooming action and focus correction of the zoom lens can be achieved merely through the movement of the first and second lens groups, it is not necessary to additionally provide a movable lens group for focus correction. The zoom lens can accordingly be fabricated in a compact size. In addition, since the first lens group having the negative refracting power and the second lens group having the positive refracting power are sequentially positioned from the subject side of the zoom lens, it is possible to provide a wide viewing angle above 60° in the wide angle position while ensuring a sufficient quantity of light.

Preferably, the second lens group includes a stop, which may be an optical surface aligned in front of a subject side of the second lens group or a device separately installed in front of a subject side of the second lens group. Since the second lens group includes the stop, the diameter of the first lens installed in front of a subject side of the first lens group can be reduced. The optical surface includes a curvature surface, such as a lens surface, a reflecting surface, a prism surface or a surface of an IR (infrared) cut-filter. The optical surface also includes a predetermined reflecting surface and a predetermined refracting surface capable of changing a light path. A flat surface is regarded herein as having an infinite curvature radius.

The third lens group preferably includes a reflecting surface for bending the optical axis. The reflecting surface can be provided in the form of a prism or a mirror. Since the third lens group bends the optical axis, the full length of the zoom lens can be established in a range between the first lens and the reflecting surface, rather than in a range between the first lens and the image surface. In addition, since it is not necessary to additionally provide a movable lens group for focus correction, the distance between the reflecting surface and the image surface can be shortened, so that the zoom lens can be fabricated in a small size.

The first lens group includes, in a preferred embodiment, at least one lens having the negative refracting power and at least one lens having the positive refracting power. It is further preferred that the lens having the negative refracting power be made from material having a low Abbe number and that the lens having the positive refracting power be made from material having a high Abbe number. With this make-up, the chromatic difference of magnification of the first lens group can be corrected. The first lens group may advantageously include at least one aspherical lens so as to minimize distortion and to obtain superior imaging performance suitable for a high-pixel camera. In this case, at least one of the lenses having the negative and positive refracting power is fabricated in the form of a one-side aspherical lens or a double-sided aspherical lens.

Preferably, the second lens group includes at least one lens having the positive refracting power and at least one lens having the negative refracting power. The lens having the negative refracting power is preferably made from material having a low Abbe number and the lens having the positive refracting power is preferably made from material having a high Abbe number. Consequently, the chromatic difference of magnification of the second lens group can be corrected.

Preferably, the zoom lens satisfies Equation 1.

$$0.6 \leq \frac{d1pw}{d1iw} \leq 0.8 \quad \text{Equation 1}$$

In Equation 1, d1pw refers to a distance along an optical axis from a front of a subject side of the first lens group to a reflecting surface, and d1iw refers to a distance along an optical axis from a front of a subject side of the first lens group to an image surface.

If the zoom lens satisfies Equation 1, the full length of the zoom lens can be established in a range between the first lens and the reflecting surface, rather than in a range between the first lens and the image surface. Notably, if a value of $$\frac{d1pw}{d1iw}$$

exceeds 0.8, it is difficult to ensure a back focal length and to obtain the compact-sized zoom lens. On the other hand, if a value of $$\frac{d1pw}{d1iw}$$

is less than 0.6, it is difficult to ensure a zoom length and to obtain a desired zoom ratio.

Preferably, the zoom lens likewise satisfies Equation 2.

$$2.8 \leq \frac{fw}{ft} \quad \text{Equation 2}$$

In Equation 2, fw refers to a full focal length in the wide angle position and ft refers to a full focal length in the telephoto position. Equation 2 thus amounts to a specification that the zoom lens has a zoom ratio above 2.8.

Embodiment 1

Figure 1:
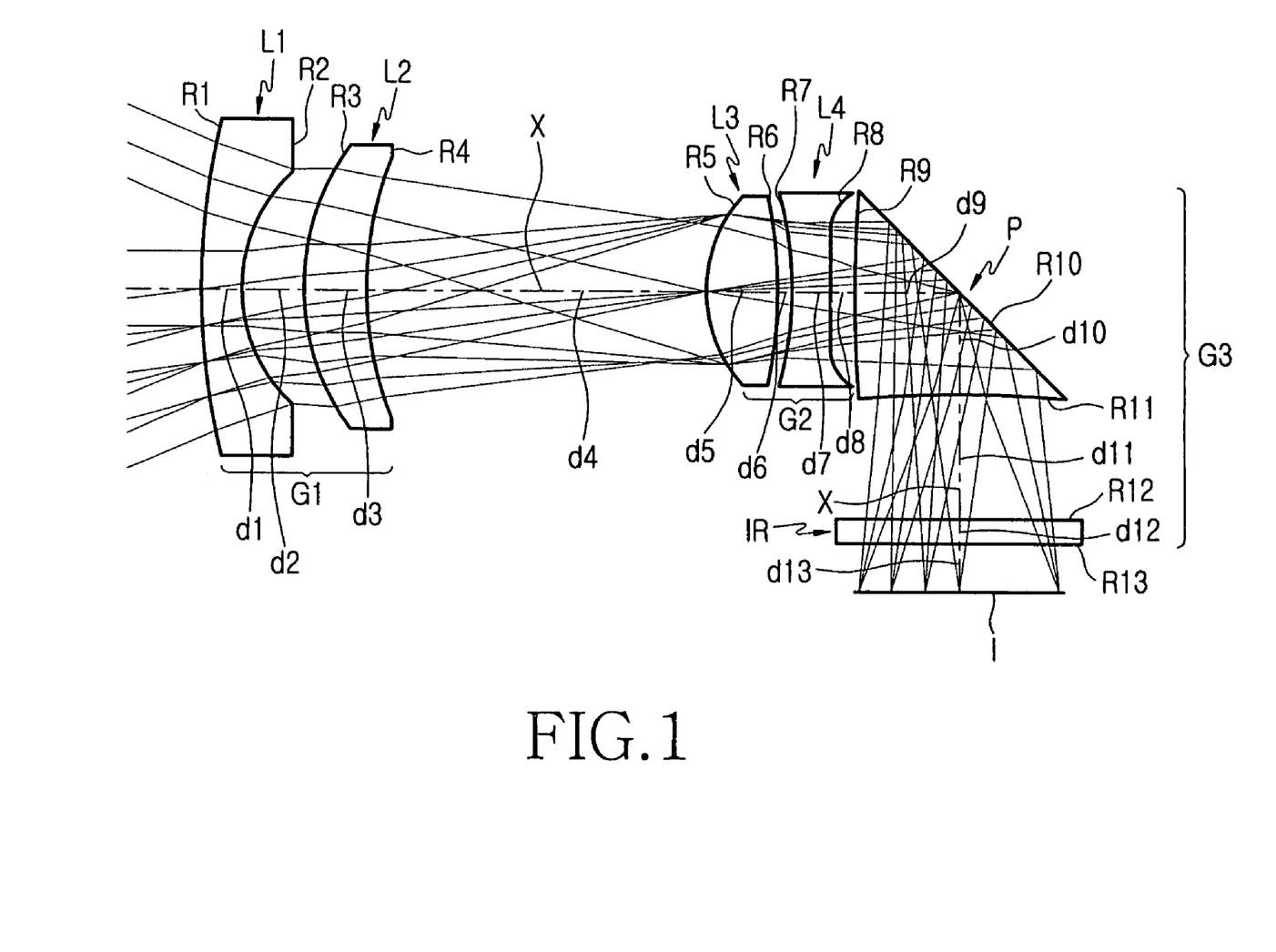
FIGS. 1 to 3 are side views illustrating zoom lenses according to a first embodiment of the present invention.
Figure 2:
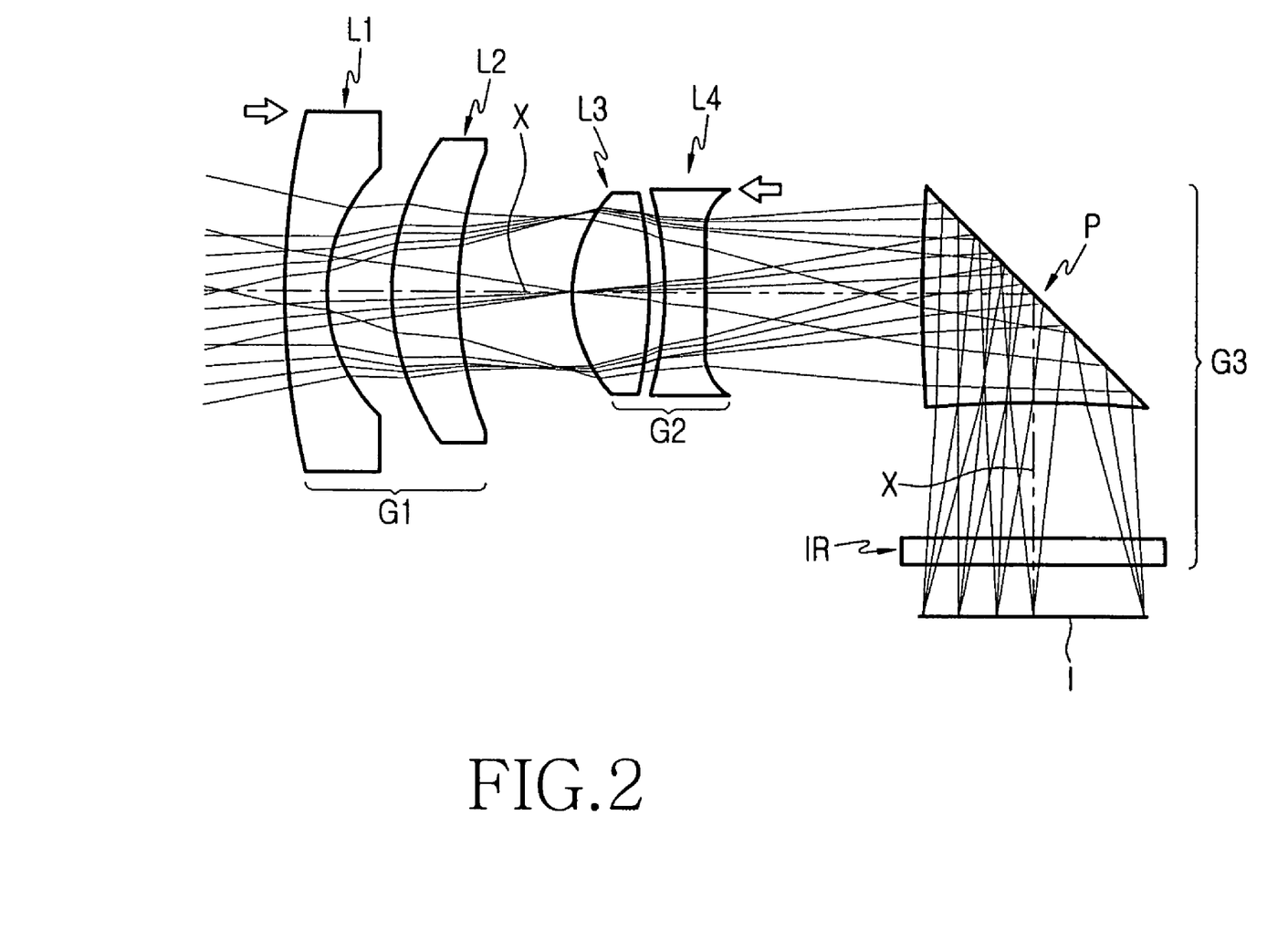
Figure 3:
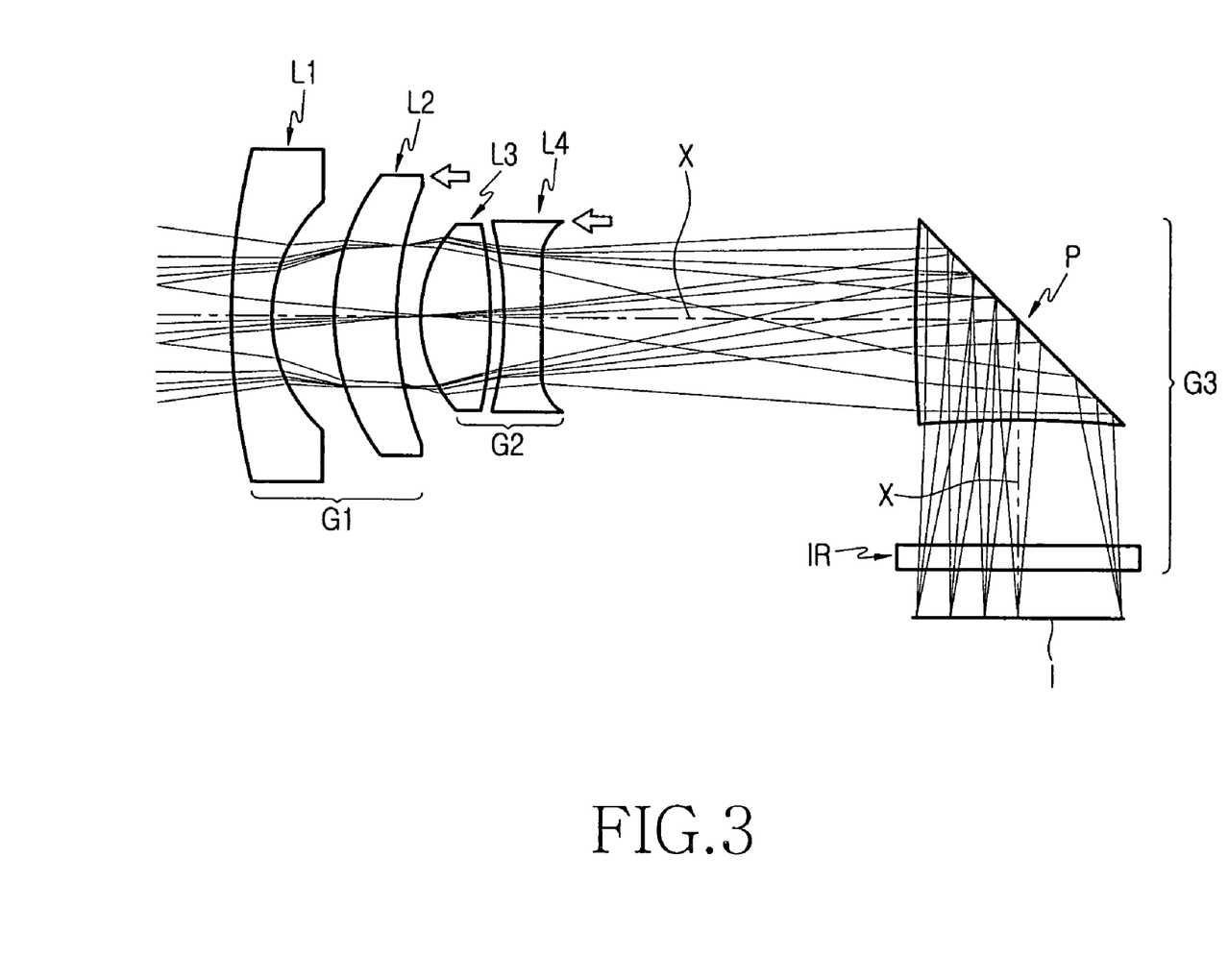

FIGS. 1 to 3 are views depicting, by way of illustrative and non-limitative example, zoom lenses according to a first embodiment of the present invention. FIGS. 1 to 3 show the zoom lenses aligned in the wide angle position, intermediate position and telephoto position, respectively, according to zooming action of the zoom lenses. In order to facilitate the explanation, it is assumed that five groups of lights having different angles with respect to an optical axis X are incident upon the zoom lenses shown in FIGS. 1 to 3.

The zoom lens includes first and second lens groups G1, G2, which are movable along the optical axis X, and a third lens group G3 which is fixedly aligned. The first to third lens groups G1 to G3 are sequentially aligned from a subject side of the zoom lens to an image surface I.

The first lens group G1 consists of first and second lenses L1, L2, which are sequentially aligned from the subject side of the zoom lens to the image surface I. The first and second lenses are double-sided aspherical lenses having the negative refracting power.

The second lens group G2 consists of third and fourth lenses L3, L4, which are sequentially aligned from the subject side of the zoom lens to the image surface I. The third lens L3 is a double-sided convex spherical lenses and the fourth lens L4 is a double-sided aspherical lens. The third and fourth lenses L3, L4 have the positive refracting power. A fifth optical surface of the third lens L3 serves as a stop for the zoom lens.

The third lens group G3 consists of a rectangular prism P and an infrared (IR) filter which are sequentially aligned from the subject side of the zoom lens to the image surface I. The rectangular prism P bends the optical axis X at a right angle and has ninth to eleventh optical surfaces, which are sequentially aligned from the subject side of the zoom lens to the image surface I. In the exemplary embodiment shown in FIGS. 1 to 3, the ninth and eleventh optical surfaces are aspherical surfaces and the tenth optical surface is a flat reflecting surface. The IR filter has a function of shielding infrared rays and both sides thereof are planarized. The third lens group G3 may have the positive or negative refracting power.

When the zoom lens performs zooming action from the wide angle position to the telephoto position, a distance between the first and second lens groups G1, G2 is shortened and a distance between the second and third lens groups G2, G3 is lengthened. More specifically, when the zoom lens performs zooming action from the wide angle position to the telephoto position, the second lens group G2 moves from the image surface I toward the subject side, and the first lens group G1 moves toward the subject side after it slightly moves toward the image surface I. Meanwhile, the third lens group G3 stays fixed.

Referring to FIG. 2, in transitioning from the wide angle position to a position intermediate between that and the telephoto position, the first lens group G1 moves toward the image surface I and the second lens group G2 moves toward the subject side.

Referring to FIG. 3, in transitioning from the intermediate position to the telephoto position, the first and second lens groups G1, G2 may move toward the subject side.

In short, the first lens group G1 moves together with the second lens group G2 during the zooming action of the zoom lens while performing the focus correction.

Table 1 contains numerical data characteristic of the zoom lens in the wide angle position. Referring to Table 1, ri is a curvature radius of an $i^{th}$ optical surface, di is a thickness or an air gap (or, a distance between the $i^{th}$ optical surface and $(i+1)^{th}$ optical surface) of the $i^{th}$ optical surface, ndi is a refractive index at a d line of the $i^{th}$ optical surface, and vi is an Abbe number of the $i^{th}$ optical surface. The curvature radius and the thickness of the $i^{th}$ optical surface are represented in millimeters by the unit "mm." The symbol "i" refers to the number sequentially assigned to the optical surfaces in a direction from the subject side to the image surface I. This rule will be identically applied to Embodiment 2.

According to Embodiment 1 of the present invention, when the zoom lens performs the zooming action from the wide angle position to the telephoto position, the total focal length f is changed from 5 to 14, the F number is changed from 3.2 to 5.7, and the viewing angle ω is changed from 35.75° to 14.42°. Thus, the full viewing angle 2ω is changed from 71.5° to 28.84°.

TABLE 1

| Surface number (i) | Curvature radius (r) | Thickness (d) | Refractive index (nd) | Abbe number (υ) |
|---|---|---|---|---|
| *1 | 60.804 | 0.848 | 1.625 | 59.31 |
| *2 | 3.732 | 1.298 | | |
| *3 | 4.290 | 1.293 | 1.755 | 27.66 |
| *4 | 5.348 | 7.199 | | |
| 5 (stop) | 2.882 | 1.504 | 1.625 | 59.31 |
| 6 | −11.442 | 0.362 | | |
| *7 | −3.659 | 0.8 | 1.755 | 27.66 |
| *8 | −13.386 | 0.500 | | |
| *9 (prism) | 24.753 | 2.173 | 1.530 | 55.80 |
| 10 | ∞ | 2.229 | 1.530 | 55.80 |
| *11 | 88.626 | 2.571 | | |
| 12 (IR filter) | ∞ | 0.52 | 1.516 | 64.14 |
| 13 | ∞ | 1.05 | | |

(Note: *i denotes aspherical surfaces)

The aspherical surface can be defined according to Equation 3.

$$x = \frac{c^2 y^2}{1 + \sqrt{1 - (K+1)c^2 y^2}} Ay^4 + By^6 + Cy^8 + Dy^{10} + Ey^{12} \qquad \text{Equation 3}$$

In Equation 3, x represents the distance between a peak point of the optical surface and the optical axis, y is the vertical distance from the optical axis, c is the curvature (reciprocal of the curvature radius) at the peak point of the optical surface, K is a conic coefficient, and A to E are aspherical coefficients.

The aspherical coefficients for the aspherical surfaces are shown in Table 2.

TABLE 2

| Surface number | K | A | B | C | D | E |
|---|---|---|---|---|---|---|
| 1 | 0 | 0.00427646 | −0.00016197 | −0.104706 × 10−4 | 0.848132 × 10−6 | −0.161769 × 10−7 |
| 2 | 0 | 0.000778410 | 0.000876590 | −0.708153 × 10−5 | −0.130187 × 10−4 | 0.667016 × 10−6 |
| 3 | 0 | −0.00744448 | 0.000907077 | −0.258852 × 10−4 | −0.320149 × 10−5 | 0.108725 × 10−6 |
| 4 | 0 | −0.00737076 | 0.000881571 | −0.534411 × 10−4 | −0.607481 × 10−6 | 0.395697 × 10−7 |
| 7 | 0 | 0.0224737 | −0.00314643 | 0.00150939 | −0.000587088 | 0.803848 × 10−4 |
| 8 | 3.355488 | 0.0270110 | −0.000508616 | 0.00125927 | −0.000435923 | 0.803387 × 10−4 |
| 9 | 0 | 0.000448534 | −0.356040 × 10−4 | 0.249040 × 10−5 | −0.191488 × 10−6 | 0 |
| 11 | 0 | 0.00124689 | −0.302562 × 10−4 | −0.299056 × 10−5 | 0.137899 × 10−6 | 0.170754 × 10−6 |

When the zoom lens performs the zooming action from the wide angle position to the telephoto position, the focal length is changed from 5.0 to 14, the air gap (d4) between first and second lens groups G1, G2 is changed from 7.199 to 0.500, and the air gap (d8) between second and third lens groups G2, G3 is changed from 0.500 to 7.990.

Figure 4A:
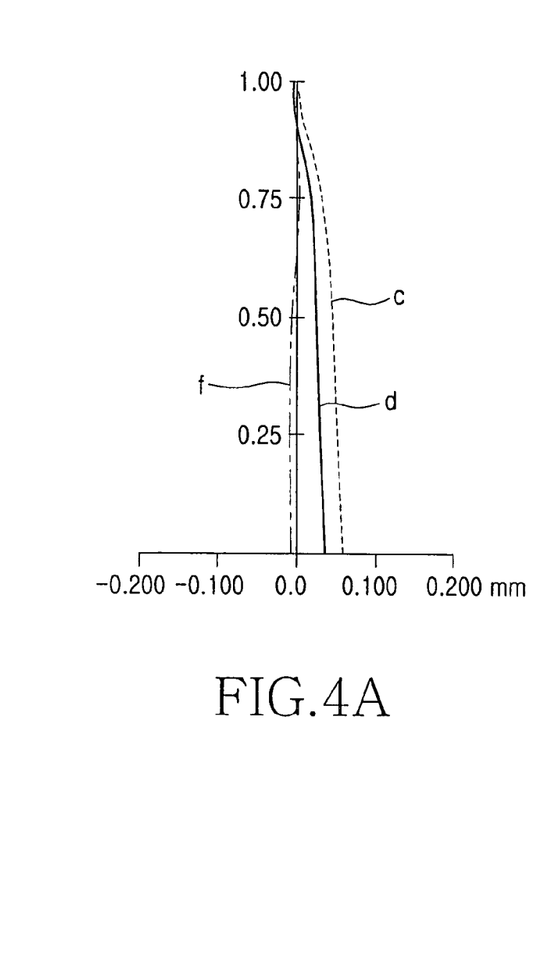
FIGS. 4A, 4B, 4C are graphs illustrating aberration curves in the wide angle position of a zoom lens, as shown in FIG. 1.
Figure 4B:
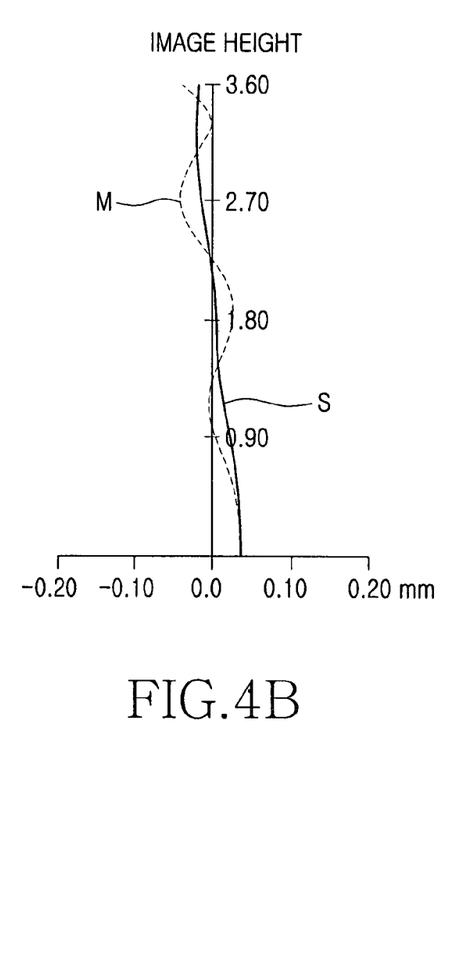
Figure 4C:
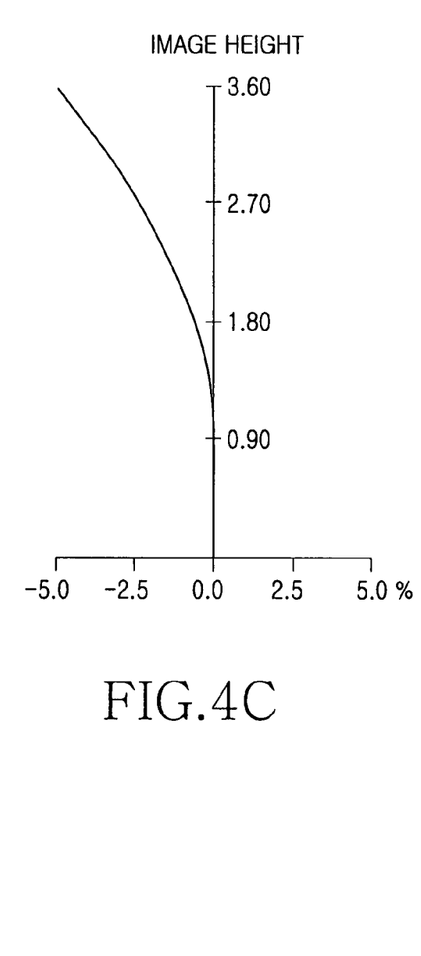

FIGS. 4A, 4B, 4C show aberration curves in the wide angle position of the zoom lens. FIG. 4A represents a longitudinal spherical aberration curve, FIG. 4B represents an astigmatic aberration curve, and FIG. 4C represents a distortion aberration curve. The solid line locus in FIG. 4A denotes a d line (587.5618 nm), the dotted line denotes a c line (656.2725 nm), and the dashed dot line denotes an f line (486.1327 nm). The astigmatic aberration curve and the distortion aberration curve are represented with respect to the d line.

Figure 5A:
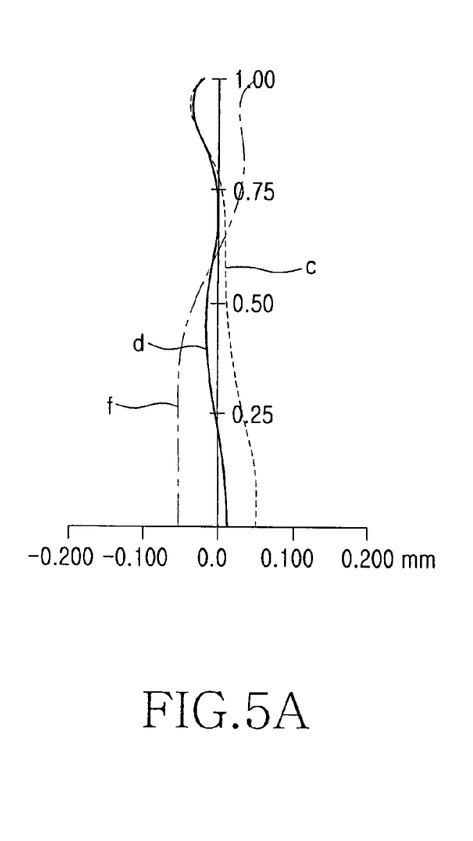
FIGS. 5A, 5B, 5C are graphs illustrating aberration curves in the telephoto position of a zoom lens, as shown in FIG. 3.
Figure 5B:
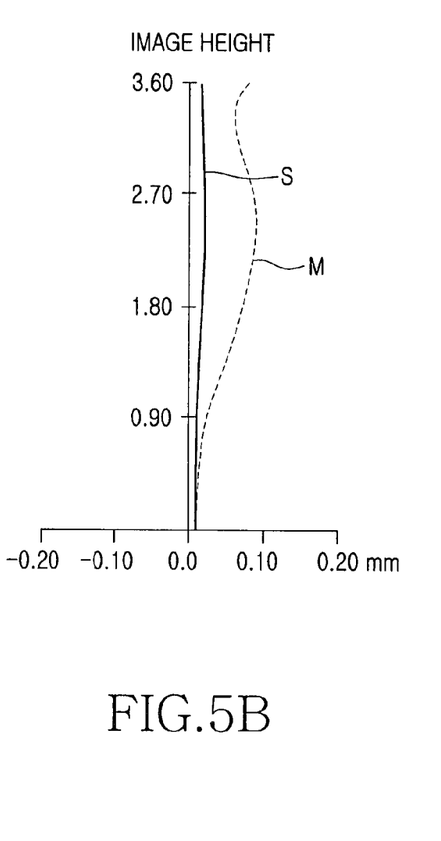
Figure 5C:
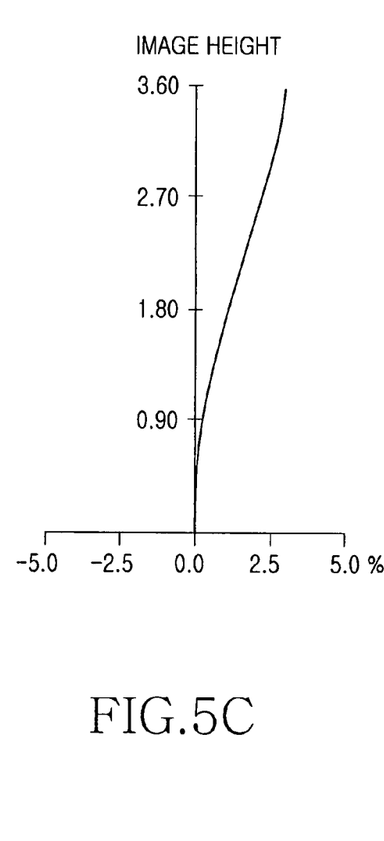

FIGS. 5A, 5B, 5C show aberration curves in the telephoto position of the zoom lens. FIG. 5A represents a longitudinal spherical aberration curve, FIG. 5B represents an astigmatic aberration curve, and FIG. 5C represents a distortion aberration curve. The solid line locus in FIG. 5A denotes a d line, the dotted line denotes a c line, and a dashed dot line denotes an f line. The astigmatic aberration curve and the distortion aberration curve are represented with respect to the d line.

Embodiment 2

Figure 6:
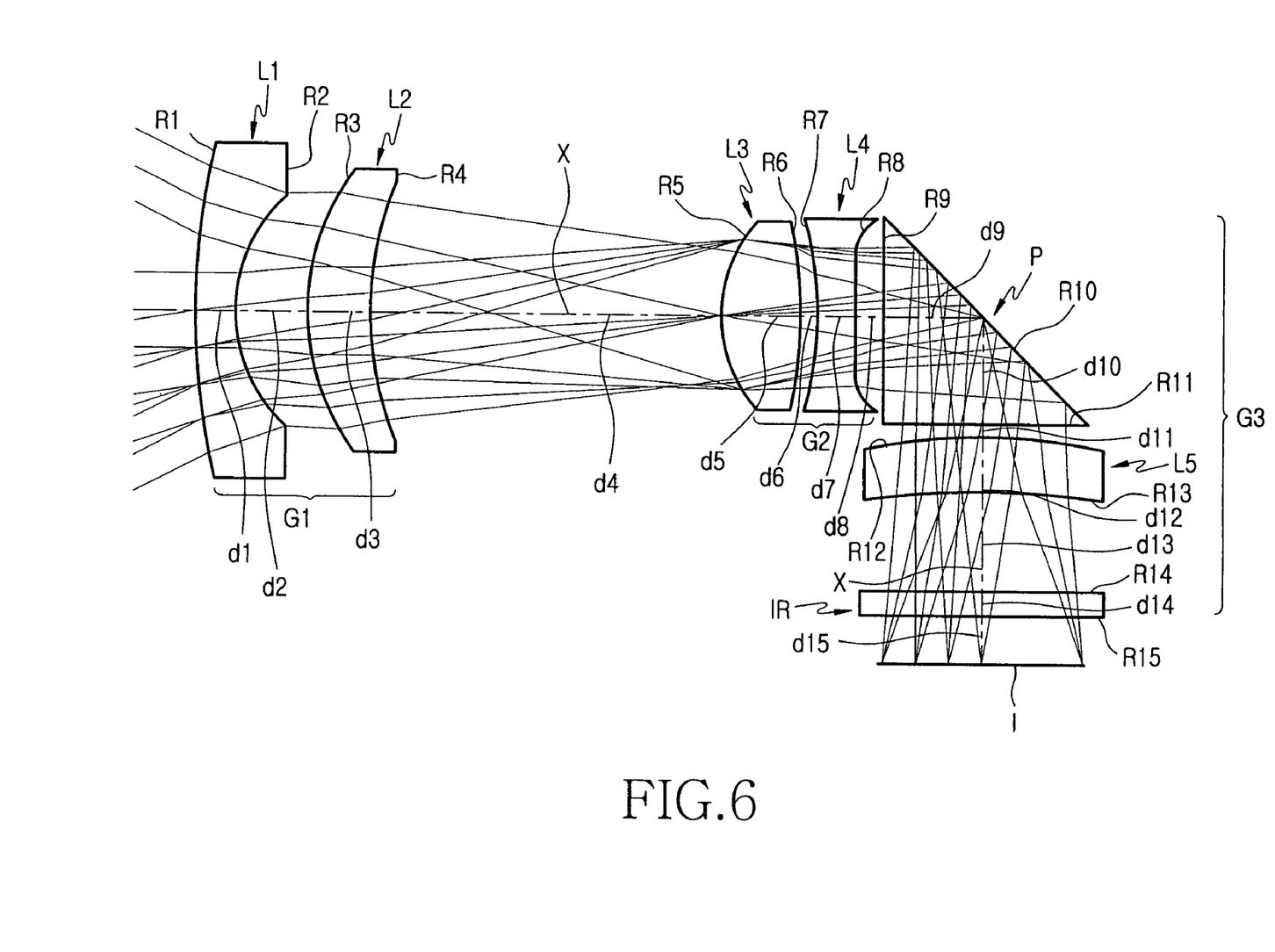
FIGS. 6 to 8 are views illustrating zoom lenses according to a second embodiment of the present invention.
Figure 7:
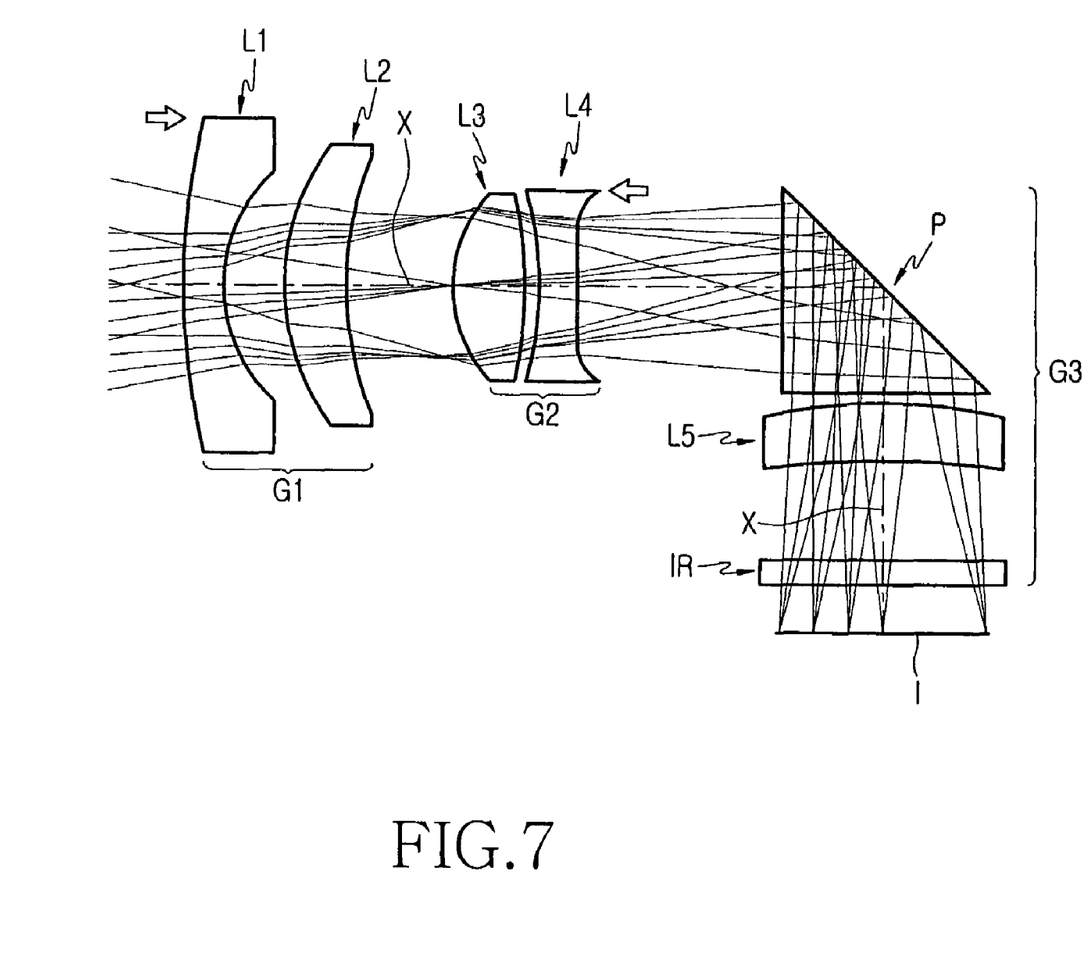
Figure 8:
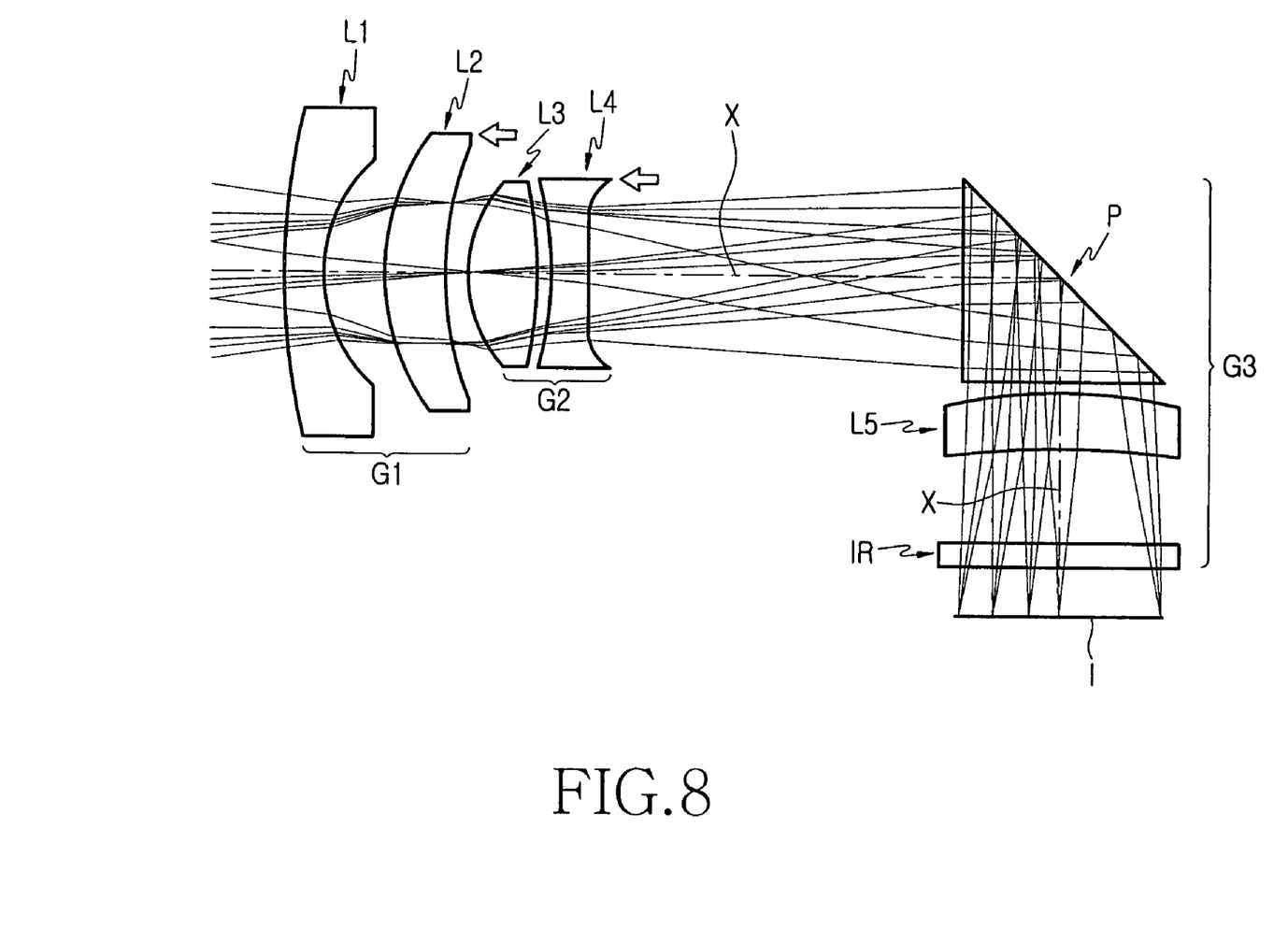

FIGS. 6 to 8 demonstrate respective zoom lens configurations according to a second embodiment of the present invention. The zoom lenses are aligned in the wide angle position, intermediate position and telephoto position, respectively, according to zooming action of the zoom lenses. For simplicity of explanation, it is assumed that five groups of lights having different angles with respect to an optical axis X are incident into the zoom lenses shown in FIGS. 6 to 8.

The zoom lens includes first and second lens groups G1, G2, which are movable along the optical axis X and a third lens group G3, which is fixedly aligned. The first to third lens groups G1 to G3 are sequentially aligned from a subject side of the zoom lens to an image surface I.

The first lens group G1 consists of first and second lenses L1, L2, which are sequentially aligned from the subject side of the zoom lens to the image surface I. The first and second lenses are double-sided aspherical lenses having the negative refracting power.

The second lens group G2 consists of third and fourth lenses L3, L4, which are sequentially aligned from the subject side of the zoom lens to the image surface I. The third lens L3 is a double-sided convex spherical lenses and the fourth lens L4 is a double-sided aspherical lens. The third and fourth lenses L3, L4 have the positive refracting power. A fifth optical surface of the third lens L3 serves as a stop for the zoom lens.

The third lens group G3 consists of a rectangular prism P, a fifth lens L5 and an infrared (IR) filter, which are sequentially aligned from the subject side of the zoom lens to the image surface I. The rectangular prism P bends the optical axis X at a right angle and has ninth to eleventh optical surfaces, which are sequentially aligned from the subject side of the zoom lens to the image surface I. In the illustrated embodiment, the ninth and eleventh optical surfaces are flat surfaces, the tenth optical surface being a flat reflecting surface. The fifth lens L5 is a double-sided aspherical lens. The IR filter functions to shield infrared rays and both sides thereof are planarized. The third lens group G3 may have the positive or negative refracting power.

When the zoom lens performs zooming action from the wide angle position to the telephoto position, the distance between the first and second lens groups G1, G2 is shortened and the distance between the second and third lens groups G2, G3 is lengthened. In more detail, when the zoom lens performs zooming action from the wide angle position to the telephoto position, the second lens group G2 moves from the image surface I toward the subject side, and the first lens group G1 moves toward the subject side after it slightly moves toward the image surface I.

Referring to FIG. 7, the first lens group G1 moves toward the image surface I and the second lens group G2 moves toward the subject side.

Referring to FIG. 8, the first and second lens groups G1 and G2 may move toward the subject side.

In effect, the first lens group G1 moves together with the second lens group G2 during the zooming action of the zoom lens while performing the focus correction.

Table 3 contains numerical data characteristic of the zoom lens in the wide angle position. According to Embodiment 2, when the zoom lens performs the zooming action from the wide angle position to the telephoto position, the total focal length f is changed from 5 to 14, the F number is changed from 3.1 to 5.5, and the viewing angle ω is changed from 35.75° to 14.42°.

TABLE 3

| Surface number (i) | Curvature radius (r) | Thickness (d) | Refractive index (nd) | Abbe number (υ) |
|---|---|---|---|---|
| *1 | −29.337 | 1.019 | 1.620 | 60.32 |
| *2 | 4.357 | 1.256 | | |
| *3 | 4.236 | 1.368 | 1.755 | 27.57 |
| *4 | 5.288 | 7.5 | | |
| 5 (stop) | 3.008 | 1.693 | 1.620 | 60.32 |
| 6 | −9.869 | 0.333 | | |
| *7 | −4.185 | 0.8 | 1.755 | 27.57 |
| *8 | −19.965 | 0.564 | | |
| 9 (prism) | ∞ | 2.167 | 1.720 | 46.83 |
| 10 | ∞ | 2.274 | 1.720 | 46.83 |
| 11 | ∞ | 0.2 | | |
| *12 | 13.781 | 1.2 | 1.530 | 55.80 |
| *13 | 20.542 | 2.077 | | |
| 14 (IR filter) | ∞ | 0.52 | 1.516 | 64.14 |
| 15 | ∞ | 1.05 | | |

(Note: *i denotes aspherical surfaces)

As mentioned above, the aspherical surface can be defined according to Equation 3.

The aspherical coefficients for the aspherical surfaces are shown in Table 4.

TABLE 4

| Surface number | K | A | B | C | D | E |
|---|---|---|---|---|---|---|
| 1 | 0 | 0.00558739 | −0.000182999 | −0.102264 × 10−4 | 0.807042 × 10−6 | −0.148633 × 10−7 |
| 2 | 0 | 0.00181265 | 0.00111252 | 0.744483 × 10−5 | −0.126567 × 10−4 | 0.667016 × 10−6 |
| 3 | 0 | −0.00795852 | 0.000968497 | −0.227580 × 10−4 | −0.300105 × 10−5 | 0.108725 × 10−6 |
| 4 | 0 | −0.00721300 | 0.000827879 | −0.312715 × 10−4 | −0.145766 × 10−5 | 0.395697 × 10−7 |
| 7 | 0 | 0.0162901 | −0.00343194 | 0.00188939 | −0.000651692 | 0.803848 × 10−4 |
| 8 | 3.355488 | 0.0220772 | −0.00145508 | 0.00169868 | −0.000542781 | 0.803387 × 10−4 |

TABLE 4-continued

| Surface number | K | A | B | C | D | E |
| --- | --- | --- | --- | --- | --- | --- |
| 12 | 0 | 0.00280883 | −0.000607273 | 0.794611 × 10−4 | −0.407337 × 10−5 | 0.471611 × 10−7 |
| 13 | 0 | 0.00414615 | −0.000536377 | 0.4029996 × 10−4 | 0.806464 × 10−6 | 0.144110 × 10−6 |

When the zoom lens performs the zooming action from the wide angle position to the telephoto position, the focal length changes from 5.0 to 14, the air gap (d4) between first and second lens groups G1, G2 changes from 7.5 to 0.500, and the air gap (d8) between second and third lens groups G2, G3 changes from 0.500 to 7.585.

Figure 9A:
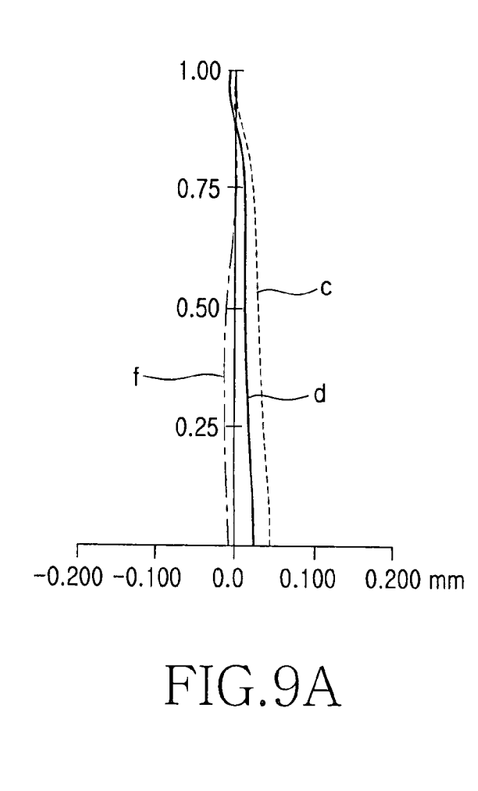
FIGS. 9A, 9B, 9C are graphs illustrating aberration curves in the wide angle position of a zoom lens, as shown in FIG. 6.
Figure 9B:
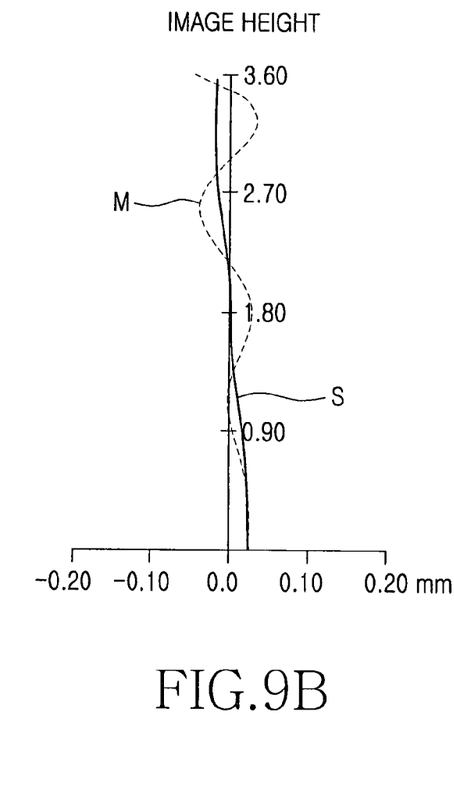
Figure 9C:
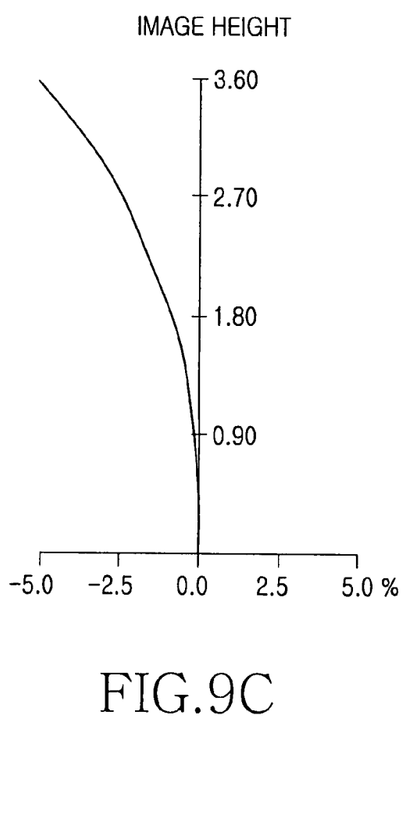

FIGS. 9A, 9B, 9C represent aberration curves in the wide angle position of the zoom lens. FIG. 9A represents a longitudinal spherical aberration curve, FIG. 9B represents an astigmatic aberration curve, and FIG. 9C represents a distortion aberration curve. The solid line locus in FIG. 9A denotes a d line, the dot line denotes a c line, and the dashed dot line denotes an f line. The astigmatic aberration curve and the distortion aberration curve are represented with respect to the d line.

Figure 10A:
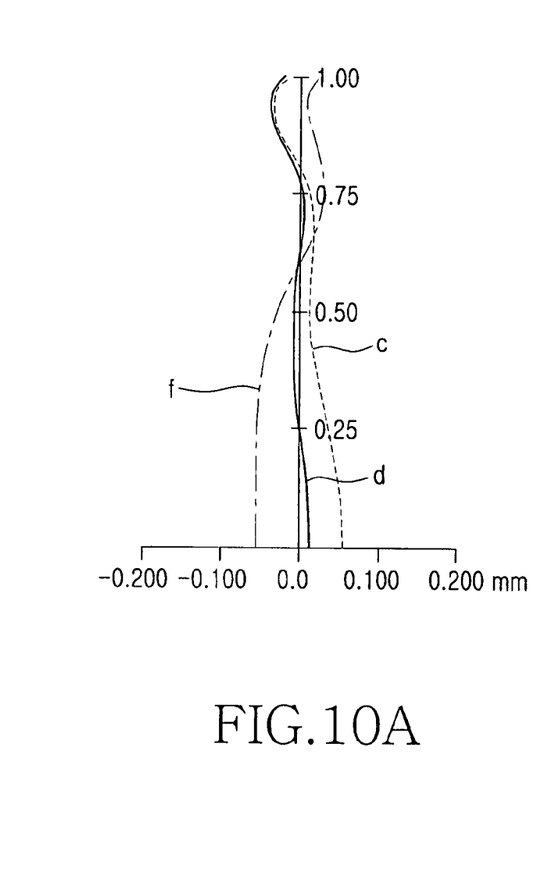
FIGS. 10A, 10B, 10C are graphs illustrating aberration curves in the telephoto position of a zoom lens, as shown in FIG. 8.
Figure 10B:
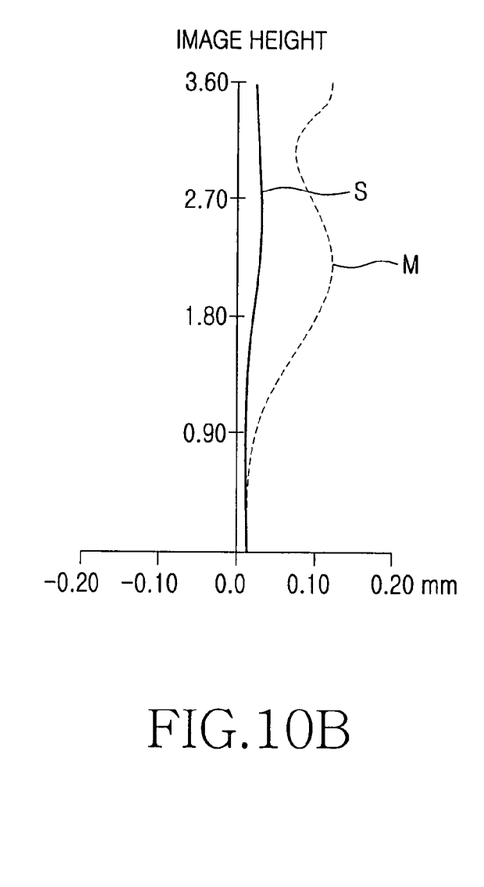
Figure 10C:
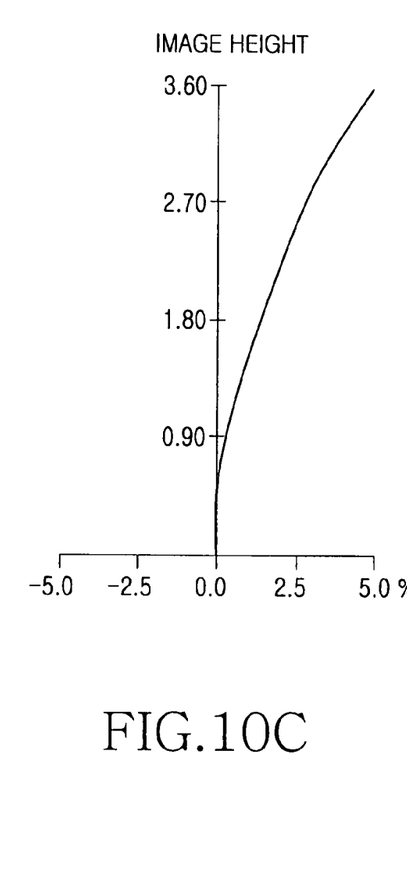

FIGS. 10A, 10B, 10C represent aberration curves in the telephoto position of the zoom lens. FIG. 10A represents a longitudinal spherical aberration curve, FIG. 10B represents an astigmatic aberration curve, and FIG. 10C represents a distortion aberration curve. The solid line locus in FIG. 10A denotes a d line, the dot line denotes a c line, and the dashed dot line denotes an f line. The astigmatic aberration curve and the distortion aberration curve are represented with respect to the d line.

As described above, the zoom lens according to the present invention can be fabricated in a compact size and can provide a zoom ratio above 2.8. In particular, when the zoom lens of the present invention is used in the wide angle position above 70°, the zoom lens enjoys superior resolution characteristics.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A zoom lens configured for creating an image surface, said zoom lens comprising:
   a first lens group having a negative refracting power;
   a second lens group having a positive refracting power and being aligned closer to said image surface than the first lens group; and
   a third lens group aligned closer to said image surface than the second lens group, wherein a distance between first and second lens groups is shortened and a distance between second and third lens groups is lengthened as the zoom lens performs zooming action from a wide angle position to a telephoto position;
   wherein the third lens group includes a reflecting surface for bending an optical axis.

2. The zoom lens as claimed in claim 1, wherein the second lens group includes a stop.

3. The zoom lens as claimed in claim 1, wherein the first lens group includes at least one lens having a negative refracting power and at least one lens having a positive refracting power.

4. The zoom lens as claimed in claim 1, wherein the second lens group includes at least one lens having a positive refracting power and at least one lens having a negative refracting power.

5. The zoom lens as claimed in claim 1, wherein the zoom lens satisfies the following equation:

$$0.6 \leq \frac{d1pw}{d1iw} \leq 0.8,$$

wherein d1pw refers to a distance along the optical axis from a front of a subject side of the first lens group to the reflecting surface, and d1iw refers to a distance along the optical axis from said front to said image surface.

6. The zoom lens as claimed in claim 1, wherein the zoom lens has a wide angle position and a telephoto position, and satisfies the following equation:

$$2.8 \leq \frac{fw}{ft}$$

wherein, fw refers to a full focal length in the wide angle position and ft refers to a full focal length in the telephoto position.

7. The zoom lens as claimed in claim 1, configured with said first lens group being movable as a unit, and with said second lens group being movable as a unit.

8. The zoom lens as claimed in claim 1, wherein said third lens group is held fixed.

9. The zoom lens as claimed in claim 1, configured for moving said first and second lens groups along said optical axis to simultaneously achieve said zooming and focus correction, without need of a lens outside the first and second groups movable for focus correction.

10. The zoom lens as claimed in claim 1, having a position intermediate between a wide angle position and a telephoto position, said zoom lens being configured to move said first lens group toward said third lens group in transitioning between said wide angle position and the intermediate position.

11. The zoom lens as claimed in claim 10, further configured for moving, in said transitioning, said second lens group away from said third lens group.

12. A zoom lens configured for creating an image surface, said zoom lens comprising:
   a first lens group having a negative refracting power;
   a second lens group having a positive refracting power and being aligned closer to said image surface than the first lens group; and
   a third lens group including a reflecting surface for bending an optical axis and being aligned closer to said image surface than the second lens group.

13. The zoom lens as claimed in claim 12, wherein the second lens group includes a stop.

14. The zoom lens as claimed in claim 12, wherein the first lens group includes at least one lens having a negative refracting power and at least one lens having a positive refracting power.

15. The zoom lens as claimed in claim 12, wherein the second lens group includes at least one lens having a positive refracting power and at least one lens having a negative refracting power.

16. The zoom lens as claimed in claim 12, wherein the zoom lens satisfies the following equation:

$$0.6 \leq \frac{d1pw}{d1iw} \leq 0.8,$$

wherein d1pw refers to a distance along the optical axis from a front of a subject side of the first lens group to the reflecting surface, and d1iw refers to a distance along the optical axis from said front to said image surface.

17. The zoom lens as claimed in claim 12, wherein the zoom lens has a wide angle position and a telephoto position and satisfies the following equation:

$$2.8 \leq \frac{fw}{ft}$$

wherein, fw refers to a full focal length in said wide angle position and ft refers to a full focal length in said telephoto position.

18. A zoom lens configured for creating an image surface, said zoom lens comprising:

a first optical system having a negative refracting power;

a second optical system having a positive refracting power and being aligned closer to said image surface than the first optical system; and a third optical system aligned closer to said image surface than the second optical system, wherein a distance between first and second optical systems is shortened and a distance between second and third optical systems is lengthened as the zoom lens performs zooming action from a wide angle position to a telephoto position;

wherein tbe third optical system includes a reflecting surface for bending an optical axis; and wherein the third optical system has a negative refracting power.

19. The zoom lens of claim 18, configured such that the first optical system moves as a unit, and such that the second optical system moves as unit.

20. The zoom lens of claim 18, wherein the reflecting surface comprises a prism, and wherein the third optical system includes a double-sided aspherical lens arranged between the prism and the image surface.

* * * * *